(12) United States Patent
Kim et al.

(10) Patent No.: US 12,195,172 B2
(45) Date of Patent: Jan. 14, 2025

(54) SKID DEVICE FOR AIRCRAFT AND METHOD FOR CONTROLLING THE SAME

(71) Applicants: Hyundai Motor Company, Seoul (KR); Kia Corporation, Seoul (KR)

(72) Inventors: Kye Yoon Kim, Gunpo-Si (KR); Choung Hyoung Kim, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/388,503

(22) Filed: Nov. 9, 2023

(65) Prior Publication Data
US 2024/0317391 A1    Sep. 26, 2024

(30) Foreign Application Priority Data
Mar. 20, 2023   (KR) .................... 10-2023-0035613

(51) Int. Cl.
*B64C 25/52*    (2006.01)
*B64C 25/58*    (2006.01)
*F16F 9/53*    (2006.01)

(52) U.S. Cl.
CPC .............. *B64C 25/52* (2013.01); *B64C 25/58* (2013.01)

(58) Field of Classification Search
CPC ........... B64C 25/52; B64C 25/58; F16F 9/535
See application file for complete search history.

(56) References Cited

U.S. PATENT DOCUMENTS

| | | | |
|---|---|---|---|
| 5,224,669 A | 7/1993 | Guimbal | |
| 11,053,031 B2* | 7/2021 | Liu | B64G 1/646 |
| 12,054,243 B2* | 8/2024 | Naganuma | B64C 27/04 |
| 2010/0206983 A1 | 8/2010 | Tho et al. | |
| 2011/0233323 A1 | 9/2011 | Engleder et al. | |
| 2013/0030614 A1 | 1/2013 | Ding et al. | |
| 2013/0248650 A1 | 9/2013 | Gorlich et al. | |
| 2016/0348749 A1 | 12/2016 | Carcaterra et al. | |
| 2023/0140387 A1* | 5/2023 | Infanti | B64C 25/62 |
| | | | 244/114 R |

FOREIGN PATENT DOCUMENTS

| | | | | |
|---|---|---|---|---|
| CN | 106986006 A | * | 7/2017 | B64C 25/12 |
| CN | 111959749 A | | 11/2020 | |
| CN | 213620223 U | | 7/2021 | |
| CN | 113757292 A | | 12/2021 | |
| CN | 111959749 B | * | 4/2022 | B64C 25/22 |

(Continued)

OTHER PUBLICATIONS

CN 106986006 A (Year: 2017).*

(Continued)

*Primary Examiner* — Brian M O'Hara
(74) *Attorney, Agent, or Firm* — Banner & Witcoff, Ltd.

(57) ABSTRACT

The present disclosure relates to a skid device for aircraft and a method for controlling the same that may implement an optimal soft landing even under varied landing conditions in various environments, and the skid device may include: at least one support leg having a hollow portion and fixed to a lower portion of a fuselage; a skid connected to an end of the support leg; a magnetic field generator installed in the hollow portion; and a magnetorheological material accommodated in the hollow portion.

17 Claims, 5 Drawing Sheets

(56) References Cited

FOREIGN PATENT DOCUMENTS

| | | | |
|---|---|---|---|
| EP | 2944567 | A1 | 11/2015 |
| JP | 2009-073209 | A | 4/2009 |
| JP | 2010-064697 | A | 3/2010 |
| KR | 10-2013-0108165 | A | 10/2013 |
| KR | 101698625 | B1 | 1/2017 |
| KR | 101825134 | B1 | 2/2018 |
| KR | 102137146 | B1 | 7/2020 |
| KR | 10-2021-0022881 | A | 3/2021 |

OTHER PUBLICATIONS

CN 111959749 B (Year: 2022).*
Yang, Xianfeng, Ma, Jingxuan, Wen, Dongsheng, and Yang, Jialing, "Crashworthy design and energy absorption mechanisms for helicopter strctures: A systematic literature review", Progress in Aerospace Sciences vol. 114 (20220) 100618, 33 pages.
Ahure Powell, Louise A., Choi, Young T., Hu, Wei and Wereley, Norman M., "Nonlinear modeling of adaptive magnetorheological landing gear dampers under impact conditions," Smart Materials and Structures, vol. 25 (2016) 115011, 11 pages.
Apr. 12, 2024—(EP) Extended Search Report—App 23209029.0.

* cited by examiner

SKID DEVICE FOR AIRCRAFT AND METHOD FOR CONTROLLING THE SAME

CROSS-REFERENCE TO RELATED APPLICATION(S)

This application claims benefit of priority to Korean Patent Application No. 10-2023-0035613 filed on Mar. 20, 2023, in the Korean Intellectual Property Office, the disclosure of which is incorporated herein by reference in its entirety.

TECHNICAL FIELD

The present disclosure relates to a skid device for an aircraft and a method for controlling the same. The skid device and the method may allow an optimal soft landing under varied landing conditions in various environments.

BACKGROUND

Skid devices are a type of landing gear for aircraft, such as rotorcraft (e.g., a helicopter, a multirotor drone, etc.). The skid device may comprise a pair of skids (e.g., left and right skids) and a pair of support legs (e.g., a pair of front and rear support legs) that are configured to connect the pair of skids to a fuselage of the aircraft.

In order to ensure sufficient absorption of energy during landing of an aircraft, one or more components of the skid device (e.g., the support legs) should be sufficiently elastically deformable. If the skid device is excessively deformable, there may be a risk that the fuselage may contact the ground.

Stress of passengers may increase during landing of an aircraft. A soft landing may relieve passenger discomfort. The ability to achieve a soft landing may be determined by, for example, qualitative skills of a pilot and/or an environment of a landing site.

A pilot's qualitative skills cannot affect an autonomously flying and/or landing aircraft. Accordingly, there is a need for a means of implementing soft aircraft landing so as to reduce stress for passengers under various landing conditions.

SUMMARY

The following summary presents a simplified summary of certain features. The summary is not an extensive overview and is not intended to identify key or critical elements.

Systems, apparatuses, and methods are described for a skid device and controlling a skid device. A skid device may comprise at least one support leg having a hollow portion and configured to be fixed to a lower portion of a fuselage; a skid connected to an end of the at least one support leg; a magnetic field generator configured to apply a magnetic field in the hollow portion; and a magnetorheological material in the hollow portion.

A method for controlling a skid device may comprise identifying information indicating a physical state and an environmental condition of a landing site; calculating a damping force of a support leg based on the physical state and the environmental condition; adjusting a stiffness of a magnetorheological material in the support leg by applying an amount of current to a magnetic field generator in the support leg, wherein the amount of current corresponds to the calculated damping force.

These and other features and advantages are described in greater detail below.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
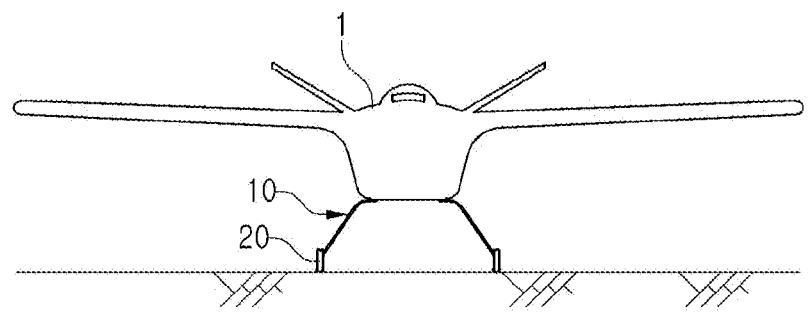
FIG. 1 is a view illustrating an example of an aircraft to which a skid device according to the present disclosure is applied.

Hereinafter, the present disclosure will be described in detail with reference to exemplary drawings. It should be noted that in adding reference numerals to elements of each of the drawings, although the same elements are illustrated in other drawings, like reference numerals may refer to like elements.

In the present specification, an aircraft may refer to a mobility vehicle configured to fly and move through the air. In other words, the aircraft may refer to a rotorcraft, a drone, a tilt rotor aircraft, a vertical take-off and landing aircraft, a fixed-wing aircraft, and the like, and may also include vehicles that can land on the ground or a structure using a skid device after flight. The aircraft may also include a manned aircraft and an unmanned aircraft. The manned aircraft may include a fuselage that can operate by autonomous flight in addition to a fuselage controlled by a pilot.

Figure 2:
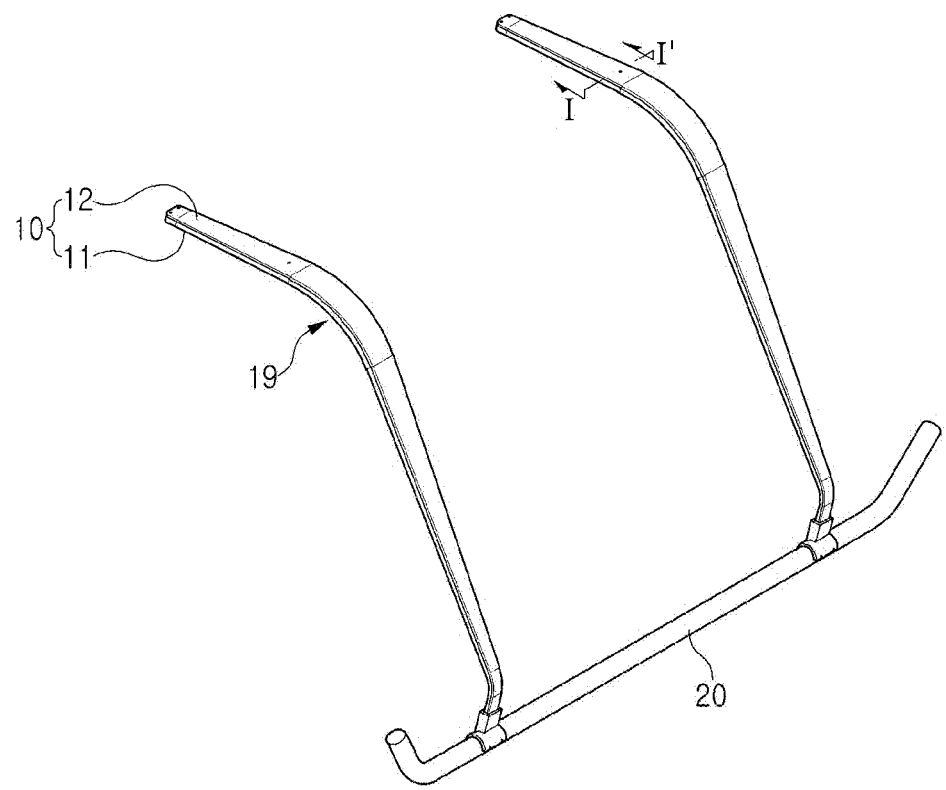
FIG. 2 is a perspective view illustrating a skid device according to the present disclosure.
Figure 3:
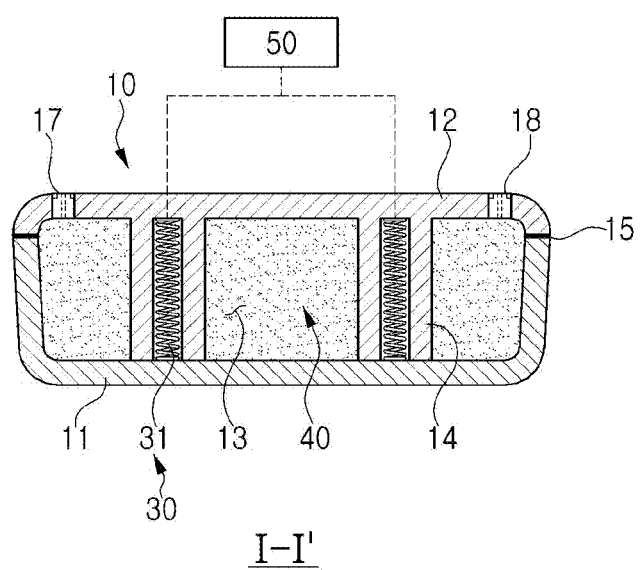
FIG. 3 is a cross-sectional view of line I-I' of FIG. 2.
Figure 4:
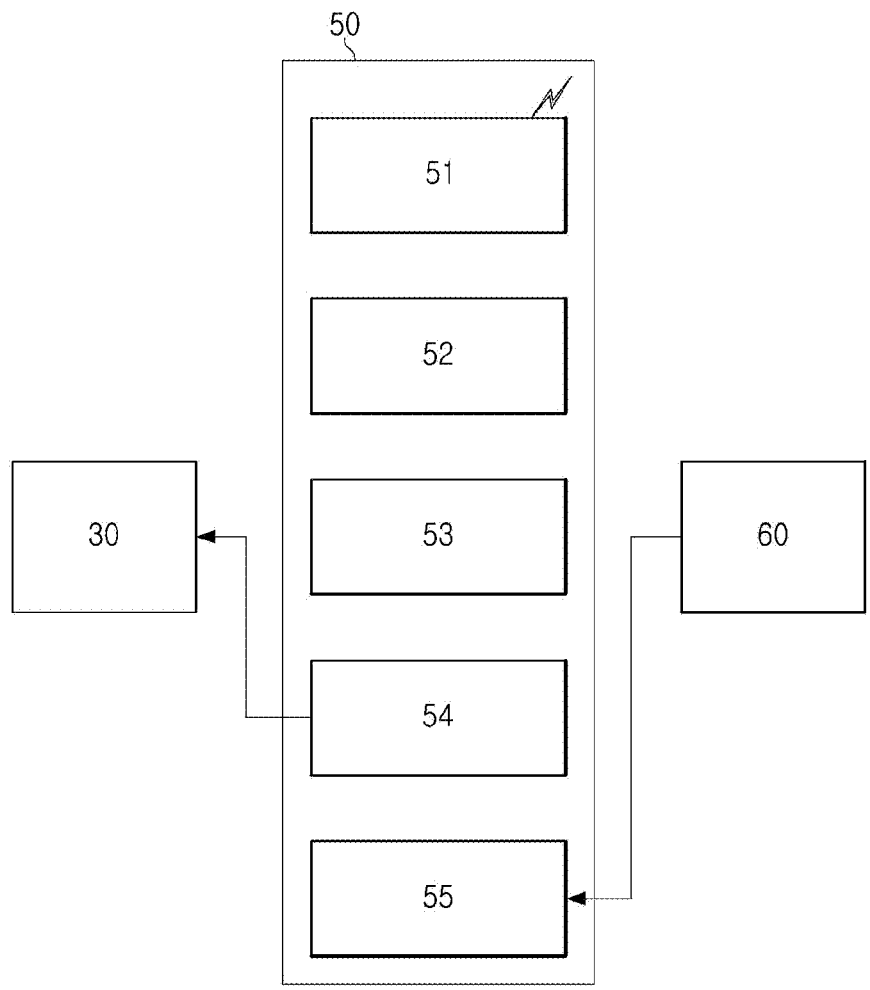
FIG. 4 is a schematic structural view illustrating a controller of a skid device according to the present disclosure.

FIG. 1 is a view illustrating an example of an aircraft to which a skid device according to the present disclosure is applied. FIG. 2 is a perspective view illustrating a skid device according to the present disclosure. FIG. 3 is a cross-sectional view of line I-I' of FIG. 2

A skid device according to the present disclosure may include a support leg 10, a skid 20, a magnetic field generator 30, and a magnetorheological material 40.

The skid device according to the present disclosure may be used, for example, as a landing device for an aircraft 1 taking off and landing in a vertical direction. The skid device includes at least one support leg 10 fixed to a lower portion of a fuselage of the aircraft 1, and a skid 20 may be connected to a lower portion of the support leg 10.

Here, the skid 20 may be configured to, if the skid device is fixed to the lower portion of the fuselage, extend substantially parallel to a longitudinal direction and/or a forward and backward direction of the aircraft 1. The skid 20 may have, for example, a tube-shape, but is not limited thereto. For example, the skid 20 may be a rod-shape, a plate-shape, etc.

A pair of skids 20 may be provided on the left and right with respect to the longitudinal direction or the forward and backward direction of the aircraft 1. In other words, the skid device according to the present disclosure may be provided in pairs, and the pair of skid devices may be fixedly mounted on left and right sides of the fuselage of the aircraft 1.

In one skid device, the support leg 10 may be provided in pairs, and a pair of support legs 10 may be disposed in front and rear sides of the skid 20, as illustrated in FIG. 2, but the present disclosure is not limited thereto.

The support leg 10 may include a leg body 11 and a cover 12. The leg body 11 may include a bottom plate and a sidewall surrounding the bottom plate. The support leg 10 may be formed in a generally thin and elongated shape.

The leg body 11 and the cover 12 of the support leg 10 may be made of one or more materials, such as a metal and/or plastic. The one or more materials may be chosen so as to effectively absorb impact energy by elastic deformation while ensuring sufficient strength. If the material is a metal, it may be molded by press molding, for example. If the material is plastic, it may be molded by injection molding, for example.

The leg body 11 and the cover 12 may be coupled to each other to form a space therein. Accordingly, the support leg 10 may have a hollow portion 13 formed between the leg body 11 and the cover 12.

At least one of the leg body 11 and the cover 12 may comprise a partition 14 configured to partition a space in the hollow portion 13. The space may be configured to accommodate the magnetic field generator 30 in the hollow portion 13 (e.g., installed in the hollow portion 13).

For example, the leg body 11 and the cover 12 may overlap each other and may then be assembled by fasteners such as bolts and nuts. Alternatively, the leg body 11 and the cover 12 may be assembled by applying an adhesive along an edge thereof, and may be assembled by overlapping and pressing each other.

If the leg body 11 and the cover 12 are assembled by bolting or an adhesive, the magnetorheological material 40 accommodated in the support leg 10 may be exposed to high pressure by impact energy, unless the support leg 10 is integrally molded. Accordingly, for example, if the magnetorheological material 40 is a fluid, a sealing member 15 withstanding the high pressure may be interposed between the leg body 11 and the cover 12.

If the leg body 11 and the cover 12 are assembled by an adhesive, the adhesive may be applied and hardened as undercoat along the edge of the leg body 11 and the cover 12. The adhesive may form a sealing layer serving to secure sealing performance between a metal and the adhesive or between plastic and the adhesive.

An assembly of the leg body 11 and the cover 12 (e.g., the leg body 11 and the cover 12 overlapping each other, and/or the sealing layer on the leg body 11 and the sealing layer on the cover 12 in contact with each other) may be heated and/or pressurized. The heating and/or pressurizing may cause the sealing layers may be integrated with each other to form the sealing member 15 between the leg body 11 and the cover 12. Accordingly, the leg body 11 and the cover 12 may be bonded to each other and the hollow portion 13 may be sealed simultaneously (e.g., via the sealing member 15).

The support leg 10 may include at least one curved portion 19. The curved portion may allow the support leg 10 to absorb a greater amount of impact energy.

The support leg 10 constructed in this manner may be elastically deformed by the impact energy applied to the skid 20 during landing of the aircraft 1. This deformation may convert the impact energy into deformation energy and absorbing the deformation energy. Thus, impact energy during landing may be absorbed by the support leg 10 along with the skid 20.

The skid device of the aircraft 1 may be able to absorb impact energy (e.g., applied in a height direction) via elastic deformation (e.g., during landing). One of the physical properties of the skid device is "vertical stiffness," which is essential for attenuating impact energy during the landing.

A damping behavior of the skid device may be represented as a result of the vertical stiffness of the support leg 10. A cross-sectional structure and/or a material of the support leg 10 may affect the vertical stiffness.

In the skid device according to the present disclosure, the damping behavior of the skid device may be effectively performed by applying the magnetorheological material 40 into the support leg 10 and affecting the vertical stiffness.

To this end, in the skid device according to the present disclosure, the magnetic field generator 30 and the magnetorheological material 40 may be disposed in the support leg 10.

The magnetic field generator 30 is configured to generate a magnetic field that affects the magnetorheological material 40, and may be stored and installed between the partitions 14 in the hollow portion 13 of the support leg 10.

The magnetic field generator 30 may be made up of a coil 31 wound N (an arbitrary natural number) times. The wound coil 31 may be electrically connected to a power source (e.g., battery, etc.) via a wire (not illustrated), thus applying a current to the coil 31.

The magnetic field generator 30 may generate a magnetic field by creating magnetization by the supply of the current, and may control the intensity of the magnetic field with the current. Accordingly, the stiffness of the magnetorheological material 40 may be changed.

Alternatively, the magnetic field generator 30 may be comprised of an electromagnet including a core and a coil 31 wound around the core. The coil 31 wound around the core may be electrically connected to the power source via the wire, thus applying the current to the coil 31.

The magnetic field generator 30 comprised of the electromagnet may generate the magnetic field by creating magnetization by the supply of the current, and a magnetic field line created by the coil 31 and a magnetic field line of the core may be added to create a stronger magnetic field. Accordingly, a magnetic field passing through the core, the leg body 11 and the cover 12 may be generated to change the stiffness of the magnetorheological material 40.

Because the stiffness and/or elastic modulus of the magnetorheological material 40 depends on the strength of the magnetic field generated by the magnetic field generator 30, if the amount of current supplied to the coil 31 is properly adjusted, a stiffness and/or elastic modulus of the support leg 10, and thereby a damping force provided by the support leg 10, may be changed according to a repeated change of the stiffness and/or elastic modulus of the magnetorheological material 40.

At least one of a magnetorheological fluid (MRF), of which the viscosity changes according to the intensity of an applied magnetic field, or a magnetorheological elastomer (MRE), of which the stiffness changes according to the intensity of the magnetic field, may be adopted as the magnetorheological material 40.

The magnetorheological fluid may be a colloidal liquid in which ferromagnetic or paramagnetic particles are dispersed, and may be formed of an organic solvent or water. The magnetorheological fluid may be provided by coating, with a surfactant, each particle (e.g., nanoparticle), which may be of a material selected from a group consisting of magnetite, magnesium, iron, and mixtures thereof, for example. Application of a magnetic field to the particles in a colloidal mixture may cause the particles to become polarized and organize into chains of the particles in the fluid.

Accordingly, physical properties of the magnetorheological fluid may be selectively converted via a magnetic field. A viscosity of the magnetorheological fluid may increase with the intensity of a magnetic field passing through the magnetorheological fluid, for example. A phase shift from liquid to solid may be occur in the magnetorheological fluid with application of a magnetic field. If application of the magnetic field is stopped (and/or decreased), the magnetorheological material 40 may decrease in stiffness and/or viscosity and/or shifted from a solid phase to a liquid phase.

The magnetorheological material 40 (e.g., magnetorheological fluid and/or magnetorheological elastomer) may be filled in the support leg 10. A magnetic field may be generated by applying current to the coil 31 of the magnetic field generator 30. The generated magnetic field may cause the stiffness of the magnetorheological (e.g., viscosity of the magnetorheological fluid) to increase according to the intensity of the magnetic field. Accordingly, as the stiffness of the magnetorheological material 40 increases, the stiffness and/or elastic modulus of the support leg 10 may increase and the damping force thereof may increase.

In the skid device according to the present disclosure, if the magnetorheological fluid is adopted as the magnetorheological material 40, the support leg 10 may further include an injection nozzle 17 for injecting the magnetorheological fluid into the hollow portion 13 and an exhaust nozzle 18 for removing air from the hollow portion 13 of the support leg 10 during the injection. A stopper for sealing may be mounted in each of the injection nozzle 17 and the exhaust nozzle 18.

The magnetorheological elastomer may be produced by mixing particles having micrometer-sized magnetic properties with polymer materials, such as natural rubber and/or silicon rubber. If a magnetic field is not applied to the magnetorheological elastomer (e.g., by the magnetic field generator 30), the magnetorheological elastomer may be relatively flexible (e.g., have low stiffness). If a magnetic field is applied (e.g., by the magnetic field generator 30), the elastic modulus and/or stiffness of the magnetorheological elastomer may change (e.g., stiffness and/or elastic modulus may increase with magnetic field intensity).

If the magnetorheological elastomer is filled in the support leg 10, for example, a first deformation and/or displacement may occur in the magnetorheological elastomer if the support leg 10 is impacted without an applied magnetic field (e.g., without a magnetic field applied by the magnetic field generator 30). A second deformation and/or displacement may occur in the magnetorheological elastomer, even if the same impact is applied to the support leg 10, with an applied magnetic field (e.g., wherein the magnetic field may be generated and/or activated by applying the current to the coil 31 of the magnetic field generator 30). The second deformation and/or displacement may be less than the first deformation and/or displacement. Accordingly, with an increase in the stiffness of the magnetorheological material 40, the stiffness and/or elastic modulus of the support leg 10 may increase and the damping force thereof may increase.

Without limitation to theory, this is because if the magnetic field is activated, particles in an elastic body receiving a force in the direction of a magnetic force line exhibit resistance to deformation even if a force is applied from the outside. Furthermore, since a magnitude of the resistance is proportional to the strength of the magnetic field, the elastic modulus and strength of the magnetorheological elastomer may be controlled by adjusting the amount of current applied to the coil 31 of the magnetic field generator 30.

In the skid device according to the present disclosure, if the magnetorheological elastomer is adopted as the magnetorheological material 40, the injection nozzle 17 and the exhaust nozzle 18 in addition to the sealing member 15 may be omitted from the support leg 10. In this case, there is an advantage that the configuration of the support leg 10 may be simplified.

FIG. 3 is a schematic structural view of a controller for controlling a skid device according to the present disclosure.

The skid device according to the present disclosure may further include a controller 50 configured to control the damping force of the support leg 10 according to information indicating a state (e.g., one or more physical properties of a landing surface of the landing site) and/or an environment (e.g., environmental conditions) of a landing site provided by a control center.

For example, information indicating a state of a landing site may indicate a hardness, a roughness, a size, an elevation, a slope, etc. of the landing site. Information indicating an environment of the landing site may include information indicating environmental conditions at the landing site, such as wind speed and/or direction, rain, sleet, snow, ice, temperature, etc. at the landing site.

The controller 50 may include an input unit 51, a calculation unit 52, a power supply unit 53, and a database 54.

The input unit 51 may include a terminal and a communication module. For example, a pilot may input data required for landing of the aircraft 1 to the controller 50 by the terminal. In particular, initial damping force of the support leg 10 may be manually input to the controller 50. The input data may be stored in the database 54.

The initial damping force is not limited to manual input, and for example, a maximum damping force of the support leg 10 may be determined by assuming a surface state of the hardest landing site and a weather state corresponding to a limitation value allowed to land the aircraft 1. The maximum damping force may be set and/or input as the initial damping force.

The hardest surface state may include, for example, asphalt, concrete, and/or steel (e.g., a steel deck on a structure). The weather limitation value may be a maximum value of landing allowance values for wind speeds, such as a maximum instantaneous wind speed and/or an average wind speed (e.g., as defined by regulations for each landing site).

Via the communication module, the controller 50 may receive a surface state of a landing site known in advance from the control center and receive information on the environment of the landing site (e.g., in real time), such as a weather state of the corresponding landing site. The received data may be stored in the database 54.

Based on data from the initial damping force of the support leg 10 or the existing damping force accumulated by the previous landing, the calculation unit 52 may calculate the damping force of the support leg 10 according to the surface state and weather state of the landing site, and calculate the amount of current to be applied corresponding to the damping force.

The surface state may be classified according to the hardness of the landing site. As described above, the surface state of the hardest hardness may include asphalt or concrete, or a steel deck on a structure. The surface state of a soft hardness may include clay or sand (coastal or desert). The surface state of an intermediate hardness may include grass, grasslands, and fields among agricultural lands.

For example, if a current landing site has the hardest surface, a weight of 1 may be assigned to the initial damping force, and as the hardness decreases, a weight of less than 1 may be assigned to the initial damping force, thus calculating damping force.

Alternatively, if the surface state corresponding to the existing damping force are the same as the surface state of the current landing site, the weight of 1 may be assigned to the damping force. Furthermore, with a decrease in the hardness of the current landing site, the weight of less than 1 may be assigned to the existing damping force. With an increase in the hardness thereof, a weight of more than 1 may be assigned to the existing damping force, so that the damping force may be calculated using the weight of more than 1 to account for the harder landing site.

Furthermore, the surface state may be classified according to a degree of slippage of the landing site, that is, roughness. The roughest surface state may be a dry surface state. A slippery surface state may include freezing conditions in winter, compacted snow, or frost conditions. The surface state of an intermediate roughness may include a surface state wet by rain, or a simple snow state (e.g., accumulated without snow compaction).

For example, if the current landing site has the roughest surface, the weight of 1 may be assigned to the initial damping force, and if the surface state is slippery, the weight of less than 1 may be assigned to the initial damping force.

Alternatively, if the surface state corresponding to the existing damping force is the same as the surface state of the current landing site, the weight of 1 may be assigned. Furthermore, if the surface state of the current landing site is considered as being slippery, the weight of less than 1 may be assigned to the existing damping force. If the surface state thereof is considered as being rough, the weight of more than 1 may be assigned to the existing damping force.

Wind is the most essential weather factor in the landing of the aircraft 1. Since a wind speed and a wind direction have a great impact on landing as well as operations of the aircraft 1, landing allowance values are set for a wind speed exceeding a certain level for each landing site, such as an airport, Vertiport, or any landing site.

For example, the landing of the aircraft 1 may be prohibited if an average wind speed for 10 minutes is 25 knots or higher, or a maximum instantaneous wind speed is more than 35 knots. The weight of 1 may be assigned to the initial damping force corresponding to the limits, and the weight of less than 1 may be assigned to the initial damping force according to a reduced wind speed. In a quiet state, for example, if a wind speed is less than 1 knot for a predetermined period of time, a minimum weight may be assigned.

Alternatively, if the weather state corresponding to the existing damping force is the same as the weather state of the current landing site, the weight of 1 may be assigned. Furthermore, as the wind speed of the current landing site is considered as being low, the weight of less than 1 may be assigned to the existing damping force, and as the wind speed thereof increases, the weight of more than 1 may be assigned to the existing damping force, so that the damping force may be calculated.

The calculation unit 52 may calculate the damping force of the support leg 10, for example, by adding and mixing weights according to the surface state and the weather state of the corresponding landing site to the initial damping force or the existing damping force. The weights may be predetermined by, for example, experiments or simulations, and stored in the database 54.

The power supply unit 53 may be controlled to apply electricity to the coil 31 constituting the magnetic field generator 30 in the support leg 10 from a power source (e.g., battery, etc.) by the amount of calculated current. The power supply unit 53 may include, for example, an electric switch, but is not limited thereto.

The database 54 may store an input and/or preset initial damping force. The database 54 may also, or alternatively, store the existing damping force(s), an average thereof, and/or a most recently used damping force corresponding to one or more previous landings. The database 54 may also, or alternatively, store various information provided by the control center, and/or the damping force calculated based on these information and data.

By repeatedly accumulating and updating the calculated damping force in the database 54, the controller 50 may learn the one or more damping forces according to a state and/or an environment of a landing site. The skid device may optimize the damping force according to the state and environment of the landing site.

The controller 50 may receive information on the state and environment of the landing site from the control center in advance or in real time, may calculate the damping force based on the initial damping force or the existing damping force according to the received information and a set control logic, and may apply electricity to the magnetic field generator 30 from a power source by the corresponding amount of current, thereby controlling the elastic modulus and/or damping force of the support leg 10. Accordingly, the controller 50 may control overall stiffness and/or damping force of the skid device according to the present disclosure.

The controller 50 may be implemented as various processing devices such as a microprocessor with a semiconductor chip configured to perform various calculations or instructions, a memory or the like embedded therein. The controller 50 may be merged into a control system of the aircraft 1 or used in combination therewith.

Furthermore, the skid device according to the present disclosure may include a sensing unit 60 monitoring a facial expression and a behavior of a passenger, and the controller 50 may include an emotion determination unit 55 determining the passenger's emotion according to the passenger's facial expression and behavior input from the sensing unit 60.

The sensing unit 60 may include, for example, a plurality of image sensors. The image sensor may be disposed on a ceiling, a sidewall, a shelf, a seat, a partition, etc., in the cabin of the aircraft 1.

The emotion determination unit 55 of the controller 50 may evaluate quantified emotional strength of the passenger by analyzing the facial expression and the behavior of the passenger sensed by the sensing unit 60.

Figure 5:
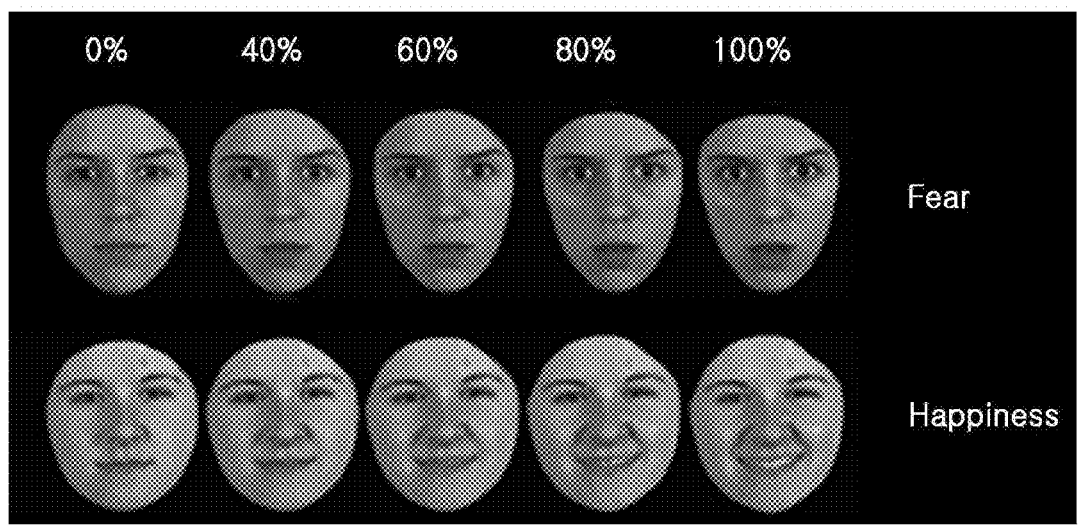
FIG. 5 is a photograph illustrating an example of determining emotional intensity represented in faces.

For example, if a large amount of impact energy is transmitted to the passenger during the landing of the aircraft 1, the intensity of tension or fear may be evaluated from the passenger's facial expression. If a soft landing is performed, the passenger may exhibit the intensity of happiness with an expressionless or smiling expression. FIG. 5 is a photograph illustrating an example of determining emotional intensity represented in faces.

Here, since various technologies have been proposed and known for acquiring and processing images of passengers' facial expressions and behaviors and evaluating emotional intensity from image-processed data, detailed explanations thereof are omitted in the present specification.

To correct the damping force according to the emotional intensity evaluated by the emotion determination unit 55, the controller 50 of the present disclosure may determine different amounts of correction corresponding to different emotional intensities in advance based on, for example, experiments or simulations. The controller 50 may store the predetermined amounts of correction corresponding to different emotional intensities in the database 54, for example. The controller 50 may store the corrected damping force (reflecting the amount of correction determined) as the existing damping force (e.g., for the location, state and environment) to use in a future landing.

For example, if the emotional determination unit 55 evaluates the passenger's emotional intensity as having a tension (fear) of above a threshold (e.g., 60% or more), the controller 50 may classify the damping force applied during the corresponding landing as requiring correction in the database 54 and store an appropriately corrected damping force in the database 54.

The calculation unit 52 may correct the damping force applied during the corresponding landing by reflecting the passenger's emotional intensity evaluated by the emotion determination unit 55, and the controller 50 may determine the corrected damping force as the existing damping force and store the damping force in the database 54. The existing damping force may be extracted as data for calculating the damping force under similar landing conditions thereafter.

If the emotional intensity evaluated by the emotion determination unit 55 is 60% or more of happiness, the calculation unit 52 does not need to correct the damping force applied during the corresponding landing, and the controller 50 may determine the damping force as optimal damping force and store the damping force in the database 54. Under the same landing conditions, the optimum damping force may be applied as damping force.

Accordingly, the skid device according to the present disclosure may provide the optimal damping force according to a surface state and/or a weather state in a case that the aircraft 1 repeats landing in the same environments (e.g., a same or similar surface state and/or a weather state).

The skid device according to the present disclosure configured as described above may be elastically deformable such that the support leg 10 may be bent by impact energy applied in a height direction (e.g., in a case that the impact energy is applied during the landing of the aircraft 1). The impact energy may be absorbed by the elastic deformation of the support leg 10.

The controller 50 may receive information on the surface state and the weather state of the landing site from the control center, may calculate the damping force based on the initial damping force or the existing damping force according to the received information and set control logic, and apply electricity to the magnetic field generator 30 from the power source by the corresponding amount of current, thereby changing the stiffness of the magnetorheological material 40 and controlling the elastic modulus and/or the damping force of the support leg 10

The skid device according to the present disclosure may implement optimal soft landing even in landing conditions in various environments by adjusting the vertical stiffness of the support leg 10 using the magnetorheological material 40.

The skid device according to the present disclosure may variously optimize the damping force of the skid device according to the state and environments of the landing site, via a process of monitoring and determining the facial expression and the behavior of the passenger during the landing. This has the effect of providing the passenger with the best happiness during the landing.

Hereinafter, a method for controlling a skid device according to the present disclosure having the above-described configuration will be briefly described.

Figure 6:
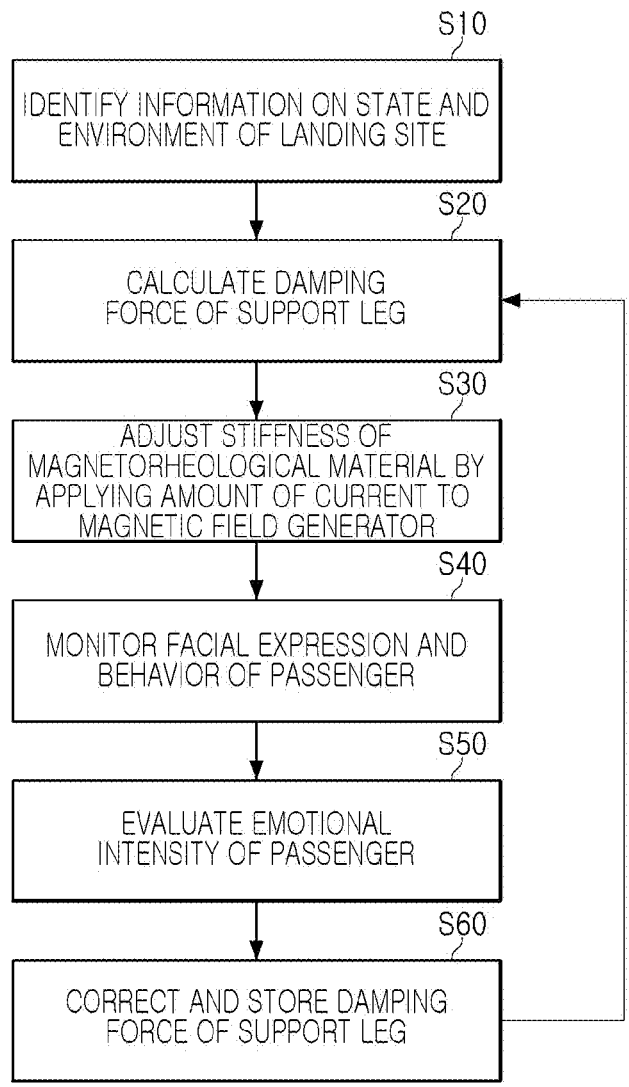
FIG. 6 is a flowchart illustrating a method for controlling a skid device according to the present disclosure.

FIG. 6 is a flowchart illustrating a method for controlling a skid device according to the present disclosure.

The control method of the skid device according to the present disclosure may include information indicating a state and/or an environment of a landing site (S10), calculating damping force of the support leg 10 according to the corresponding state and environments (S20), and adjusting the stiffness of the magnetorheological material 40 by applying the amount of current corresponding to the calculated damping force to the magnetic field generator 30 (S30).

The controller 50 may receive the surface state of the landing site from the control center via a communication module of the input unit 51, and may receive the information on the environments in real time, such as the weather state of the landing site and the like.

The calculation unit 52 of the controller 50 may then calculate the damping force according to the surface state and the weather state of the landing site based on the data of the initial damping force or the existing damping force accumulated by the previous landing, and may calculate the amount of to be applied corresponding thereto.

For example, the surface state may be classified according to the hardness and/or degree of slippage of the landing site, that is, roughness. A corresponding weight may be assigned to the initial damping force or the existing damping force according to the corresponding surface state. Furthermore, in the weather state, weights may be assigned to the initial damping force or the existing damping force according to a wind speed within landing allowances of the wind speed.

The calculation unit 52 may calculate the damping force, for example, by adding and mixing weights according to the surface state and the weather state of the corresponding landing site to the initial damping force or the existing damping force. These weights may be determined in advance based on, for example, experiments or simulations, and stored in the database 54.

The controller 50 may control the power supply unit 53 and apply electricity to the magnetic field generator 30 in the support leg 10 from the power source by the calculated amount of current.

The stiffness of the magnetorheological material 40 accommodated in the support leg 10 may vary depending on the intensity of the magnetic field generated by the magnetic field generator 30, and the elasticity and the damping force of the support leg 10 may be changed according to the change in the stiffness of the magnetorheological material 40.

For example, if there is a strong wind at landing site and/or the landing site has a hard surface state, the support leg 10 may be adjusted to exert a large damping force. To this end, the amount of current may be adjusted to increase the intensity of the magnetic field which may increase the stiffness and/or elastic modulus of the magnetorheological material 40. In this case, the stiffness and/or elastic modulus of the support leg 10 increases.

If wind is still at the landing site in a soft surface state, the damping force of the support leg 10 may be reduced. To this end, the amount of current may be adjusted to reduce the intensity of the magnetic field and decrease the stiffness of the magnetorheological material 40. In this case, the stiffness and/or elastic modulus of the support leg 10 decreases.

Accordingly, the skid device according to the present disclosure has the effect of implementing optimal soft landing even in landing conditions in various environments by adjusting the damping force of the support leg 10 using the magnetorheological material 40.

The control method of the skid device according to the present disclosure may further include monitoring a facial expression and a behavior of a passenger during the landing (S40), evaluating an emotional intensity of the passenger according to the passenger's facial expression and behavior (S50), and correcting and storing the damping force of the support leg 10 applied during the corresponding landing by reflecting the evaluated emotional intensity of the passenger (S60).

The sensing unit 60 connected to the controller 50 may monitor the facial expression and the behavior of the passenger based on images acquired during the landing.

The emotion determination unit 55 of the controller 50 may evaluate the quantified emotional strength of the passenger from the images of the passenger's facial expression and behavior sensed by the sensing unit 60.

For example, if the emotional determination unit 55 evaluates the passenger's emotional intensity as having a tension (fear) of 60% or more, the damping force applied during the landing may be classified in the database 54 as data requiring the correction.

The calculation unit 52 of the controller 50 may correct the damping force applied the corresponding landing by reflecting the passenger's emotional intensity evaluated by the emotion determination unit 55, and the controller 50 may determine the corrected damping force as the existing damping force and store the damping force in the database 54.

If the emotional intensity evaluated by the emotion determination unit 55 is 60% or more of happiness, the calculation unit 52 does not need to correct the damping force applied during the landing, and the controller 50 may determine the damping force as the optimal damping force and store the damping force in the database 54.

If the aircraft 1 repeats landing in the same environment and/or at the same or similar landing site (e.g., at a site with similar surface state, in similar weather state and/or conditions, etc.), the skid device according to the present disclosure may provide the optimal damping force according to the surface state and weather state.

The present disclosure provides a skid device for an aircraft and a method for controlling the same that may implement a soft landing even under varied landing conditions in various environments.

A skid device may include: at least one support leg having a hollow portion and fixed to a lower portion of a fuselage; a skid connected to an end of the support leg; a magnetic field generator installed in the hollow portion; and a magnetorheological material accommodated in the hollow portion.

The support leg may include a leg body and a cover, the leg body and the cover may be coupled to each other to form the hollow portion, and at least one of the leg body and the cover may be provided with a partition formed to partition a space for installing the magnetic field generator in the hollow portion.

A sealing member may be interposed between the leg body and the cover.

The magnetic field generator may include a wound coil or an electromagnet having a coil wound around a core.

The magnetorheological material may include at least one of a magnetorheological fluid of which the viscosity changes according to an intensity of a magnetic field or a magnetorheological elastomer of which the stiffness changes according to the intensity of the magnetic field.

If the magnetorheological material is a magnetorheological fluid, the support leg may further include an injection nozzle for injecting the magnetorheological fluid into the hollow portion and an exhaust nozzle for removing air from the hollow portion during the injection.

The skid device may further include a controller configured to control damping force of the support leg according to information on a state and environment of a landing site.

The controller may include: an input unit in which initial damping force is input and information on a surface state and a weather state of the landing site is received; a calculation unit configured to calculate the damping force of the support leg according to the surface state and the weather state of the landing site based on data of the initial damping force or existing damping force, and calculate an amount of current to be applied corresponding thereto; a power supply unit configured to apply electricity to the magnetic field generator from a power source by the calculated amount of current; and a database configured to store the input initial damping force, accumulated existing damping force, the received information, and the calculated damping force.

The skid device may further include a sensing unit configured to monitor a facial expression and behavior of a passenger, and the controller may include an emotion determination unit configured to determine an emotion of the passenger according to the facial expression and the behavior of the passenger input from the sensing unit.

A method for controlling the skid device may include: identifying information on a state and an environment of a landing site; calculating damping force of a support leg according to the state and the environment of the landing site; adjusting stiffness of a magnetorheological material in the support leg by applying an amount of current corresponding to the calculated damping force to a magnetic field generator in the support leg.

In the identifying information on a state and environment of a landing site, the controller may receive the state of the landing site from a control center and receive information on a weather state in real-time.

In the calculating damping force of a support leg, the controller may calculate the damping force according to a surface state and a weather state of the landing site based on data of the initial damping force or the existing damping force, and may calculate an amount of current to be applied corresponding thereto.

The damping force may be calculated by adding and mixing weights according to the surface state and the weather state of the landing site to the initial damping force or the existing damping force.

The method for controlling the skid device may further include: monitoring a facial expression and behavior of a passenger during landing; evaluating an emotional intensity of the passenger according to the facial expression and the behavior of the passenger; and correcting and storing the damping force of the support leg applied during the landing by reflecting the evaluated emotional intensity of the passenger.

The facial expression and the behavior of the passenger may be monitored by a plurality of image sensors, and the controller may quantifiably evaluate the emotional intensity of the passenger from an image of the facial expression and the behavior of the passenger.

If the emotional intensity of the passenger is evaluated as having tension (fear) that is equal to or more than a certain value (and/or having happiness that is less than a certain happiness value), the damping force applied during the landing may be determined to require correction. If the emotional intensity of the passenger is evaluated as having happiness that is equal to or more than a certain value (and/or having tension that is less than the certain value), the damping force applied during the landing may be determined and stored as an optimal damping force.

Accordingly, the skid device according to the present disclosure may flexibly optimize the damping force of the skid device according to the state and environments of the landing site by the process of monitoring and determining the facial expression and the behavior of the passenger during the landing. This may have the effect of providing the passenger with the best happiness during the landing.

The descriptions stated above merely illustrate the technical idea of the present disclosure, and it will be apparent to those skilled in the art that modifications and variations could be made without departing from the essential characteristics of the present disclosure.

Therefore, the examples disclosed in this specification and drawings are not intended to limit the scope of the disclosure, but are only used to explain the technical idea of the present disclosure. The scope of protection of the present disclosure should be interpreted by the appended claims, and all technical concepts within the scope equivalent thereto should be interpreted as being included in the present disclosure.

What is claimed is:

1. A skid device comprising:
   at least one support leg having a hollow portion and configured to be fixed to a lower portion of a fuselage;
   a skid connected to an end of the at least one support leg;
   a magnetic field generator configured to apply a magnetic field in the hollow portion; and
   a magnetorheological material in the hollow portion.

2. The skid device according to claim 1, wherein the support leg comprises a leg body and a cover,
   wherein the leg body and the cover are coupled to each other to form the hollow portion, and
   wherein at least one of the leg body or the cover comprises a partition that forms a space configured to accommodate the magnetic field generator in the hollow portion.

3. The skid device according to claim 2, further comprising a sealing member interposed between the leg body and the cover.

4. The skid device according to claim 1, wherein the magnetic field generator comprises at least one of:
   a wound coil, or
   an electromagnet having a coil wound around a core.

5. The skid device according to claim 1, wherein the magnetorheological material comprises at least one of:
   a magnetorheological fluid having a viscosity that depends on an intensity of a magnetic field applied to the magnetorheological fluid; or
   a magnetorheological elastomer having a stiffness that depends on an intensity of a magnetic field applied to the magnetorheological elastomer.

6. The skid device according to claim 5, wherein the magnetorheological material is a magnetorheological fluid and the support leg further comprises:
   an injection nozzle for injecting the magnetorheological fluid into the hollow portion, and
   an exhaust nozzle for removing air from the hollow portion during the injection.

7. The skid device according to claim 1, further comprising a controller configured to control a damping force of the support leg based on information indicating one or more of a physical property of a landing site or an environmental condition at the landing site.

8. The skid device according to claim 7, wherein the controller comprises:
   an input unit configured to receive:
      input of an initial damping force,
      information indicating a surface state of the landing site, and
      information indicating a weather state of the landing site;
   a calculation unit configured to calculate:
   the damping force of the support leg based on the surface state, the weather state of the landing site and at least one of the initial damping force or a previously applied damping force, and
      an amount of current to be applied corresponding to the damping force; and
   a power supply unit configured to apply the calculated amount of current from a power source to the magnetic field generator.

9. The skid device according to claim 8, wherein the controller comprises a database configured to store the input initial damping force, one or more previously applied damping forces, the received information indicating the surface state, the received information indicating the weather state, and the calculated damping force.

10. The skid device according to claim 7, further comprising a sensing unit configured to monitor one or more of a facial expression or a behavior of a passenger,
   wherein the controller comprises an emotion determination unit configured to determine an emotion of the passenger according to the facial expression or the behavior of the passenger received from the sensing unit.

11. A method for controlling a skid device, the method comprising:
   identifying information indicating a physical state and an environmental condition of a landing site;
   calculating a damping force of a support leg based on the physical state and the environmental condition; and
   adjusting a stiffness of a magnetorheological material in the support leg by applying an amount of current to a magnetic field generator in the support leg, wherein the amount of current corresponds to the calculated damping force.

12. The method for controlling the skid device of claim 11, wherein the information indicating the physical state is received from a control center and information indicating the environmental condition comprises information indicating a real-time weather state of the landing site.

13. The method for controlling the skid device of claim 12, wherein the calculating the damping force of the support leg is based on a surface state of the landing site, the weather state of the landing site and one or more of an initial damping force or a previous damping force, the method further comprising calculating the amount of current corresponding to the damping force.

14. The method for controlling the skid device of claim 13, wherein the calculating the damping force comprises applying one or more weights, based on one or more of the surface state or the weather state of the landing site, to one or more of the initial damping force or the previous damping force.

15. The method for controlling the skid device of claim 11, further comprising:
- monitoring one or more of a facial expression or a behavior of a passenger during landing;
- evaluating emotional intensity of the passenger according to the one or more of the facial expression or the behavior of the passenger; and
- correcting and storing the damping force of the support leg applied during the landing with information reflecting the evaluated emotional intensity of the passenger.

16. The method for controlling the skid device of claim 15, wherein the one or more of the facial expression or the behavior of the passenger are monitored based on image information from a plurality of image sensors, and
- wherein the controller quantifiably evaluates the emotional intensity of the passenger based on the image information.

17. The method for controlling the skid device of claim 16, wherein, if the emotional intensity of the passenger is evaluated as having tension that is equal to or more than a threshold value, the damping force applied during the landing is determined to require correction, and
- if the emotional intensity of the passenger is evaluated as having happiness that is equal to or more than a certain value, the damping force applied during the landing is stored as an optimal damping force.

* * * * *